Sept. 5, 1967 A. KLEIN 3,339,430
COMPENSATION OF OUT-OF-BALANCE OF ROTATING MASSES
Filed Aug. 11, 1964
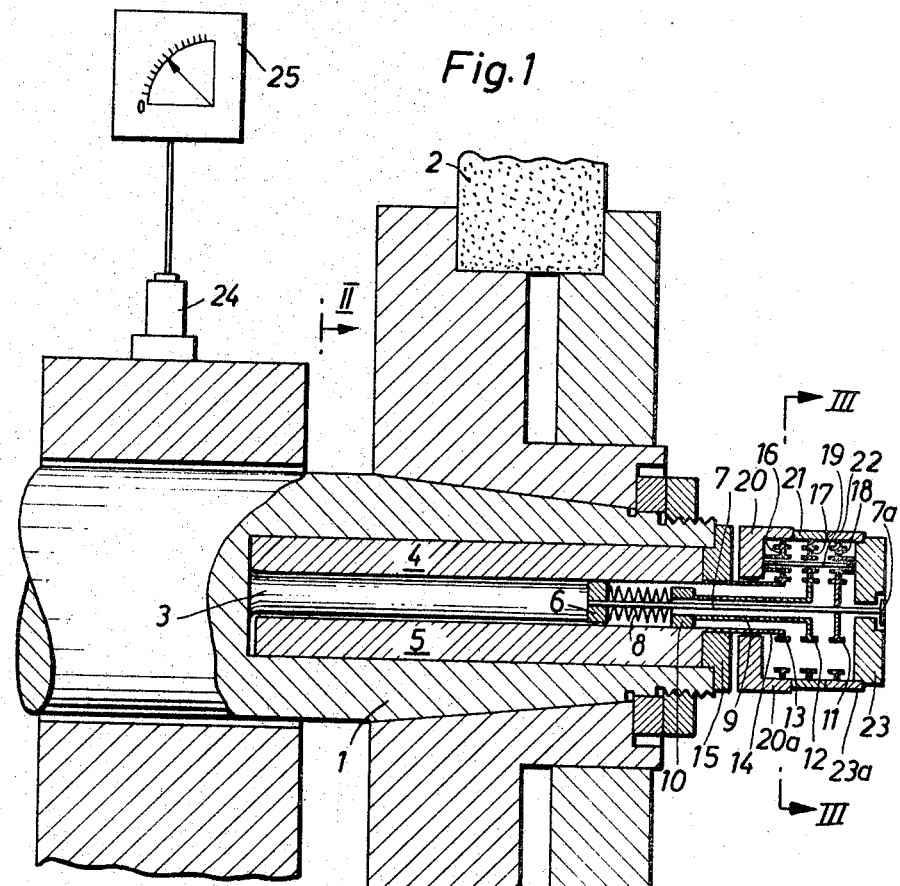
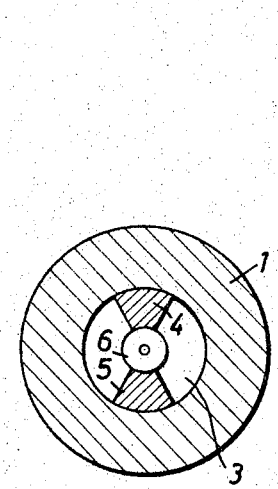
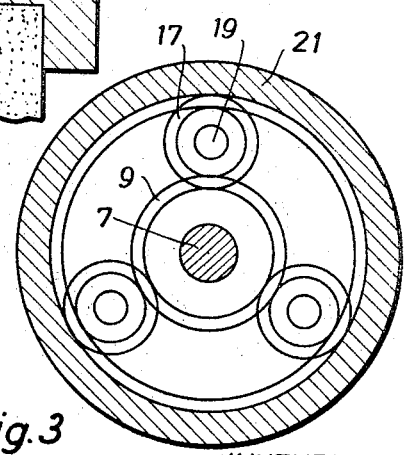
INVENTOR
A. Klein
BY
Richards & Geier
ATTORNEYS

United States Patent Office 3,339,430
Patented Sept. 5, 1967

3,339,430
COMPENSATION OF OUT-OF-BALANCE OF
ROTATING MASSES
Artur Klein, Austrasse 6a, Netphen,
Kreis Siegen, Germany
Filed Aug. 11, 1964, Ser. No. 388,826
Claims priority, application Germany, Aug. 13, 1963,
W 35,082
7 Claims. (Cl. 74—573)

The invention relates to a device for compensating out-of-balance of rotating masses, in particular but not exclusively of grinding wheels. Its purpose is a constructional simplification and an increase in the reliability of the known counterbalancing devices having two balancing weights spaced from the axis of the rotating mass and serving to load it, which are adjustable in their angular position relative to the rotating mass both in common and individually.

According to the invention the balancing weights consist of respective bodies adjustable in a circular path in a central longitudinal bore in the shaft carrying the mass and the means for adjusting these balancing weights comprises three internally toothed rings mounted outside the shaft and rotatable coaxially in relation thereto, and at least one set of planet wheels rotatable on a common stem each (or each group) of which meshes with a respective ring and one of three coaxial pinions, one of which pinions is coupled to the shaft and the other two of which are coupled each to one balancing weight.

The balancing weights are preferably elongated bodies which are of annular sector form in cross section and each of which has an inner circular extension coaxial with the shaft, of a diameter which corresponds to the distance of the balancing weight from the axis of the rotating mass, i.e. in the case of weights of sector form to the internal diameter of the sectors. A compression spring or the like e.g. a bellows-like body is interposed between the two extensions.

In a preferred embodiment of a compensating device according to the invention one of the pinions coupled to one of the balancing weights is secured to one end of a spindle the other end of which is fixed centrally in the circular extension of this balancing weight while the other pinion coupled to a balancing weight is secured to one end of a sleeve surrounding the spindle and the other end of which is fixed in the circular extension of this other balancing weight.

It is further proposed that the pinion coupled to the shaft carrying the rotating mass should be secured to the end of a sleeve projecting from the shaft the other end of this sleeve being fixed centrally in a cover ring for the bore mounted on the end of the shaft.

The outer end of the spindle fixed in one of the circular extensions may be constructed as a retainer for an end plate which holds the adjusting means for the balancing weights in relation to the end of the shaft.

Further developments and advantages of the invention will appear from the following description of an example of a compensating device according to the invention illustrated in the accompanying diagrammatic drawing in which:

FIGURE 1 is a longitudinal section, and

FIGURE 2 a detail cross section, it being understood that the invention is not limited to the construction illustrated, FIGURE 3 is a section along the line III—III of FIG. 1.

The example relates to a grinding spindle the conical tapering end portion 1 of which is provided with a central longitudinal cylindrical bore 3 in the region of the flange which supports the grinding wheel 2. In this bore are received slidingly and in rubbing contact two equal balancing weights 4 and 5. The balancing weights 4 and 5 are of circular annular sector form in cross section and are movable in a circular path about the axis of the shaft 1 along the wall of the bore 3.

The balancing weight 4 is secured by a screw to an extension in the form of a circular disc 6 coaxial with the shaft 1 and the diameter of which corresponds to the internal diameter of the weights 4 and 5. The disc 6 is fixed to the weight 4 by screws (not shown). Into the centre of the disc 6 is fixed the end of a spindle 7 which extends through a compression spring 8 abutting the surface of the disc 6 and through a sleeve 9, which latter is fixed in the centre of a circular disc 10. The disc 10 is similar to the disc 6 and is secured by a screw (not shown) to the balancing weight 5. The sleeve 9 forms a circular extension thereof coaxial with the shaft 1. The end of the spindle 7 projecting from the sleeve 9 has a pinion 7a secured on it while the end of the sleeve 9 projecting out of the shaft 1 has a pinion 12 secured on it. In this way the pinion 11 is coupled to the balancing weight 4 while the pinion 12 which is coaxial with it and of the same size is coupled to the balancing weight 5.

A third sun pinion 13 of the same size as and coaxial with the pinions 11 and 12 is secured to a sleeve 14 which is concentric to and surrounds sleeve 9 and spindle 7, this sleeve 14 being fixed centrally in a cover ring 15 for the bore 3 which is secured on the end of the shaft 1. The ring 15 is fixed to the shaft 1 by screws (not shown). The pinion 13 meshes with a planet wheel 16, the pinion 12 meshes with a planet wheel 17 and the pinion 11 meshes with a planet wheel 18. The planet wheels 16, 17, 18 are rotatable upon a stem 19 and with the latter can make a planetary motion within an annular space which is internally bounded by the pinions 11, 12 and 13 and externally bounded by coaxial internally toothed rings 20, 21 and 22 arranged side by side and meshing with the pinions 16, 17 and 18 respectively.

The ring 20 which is next to the ring 15 is rotatably mounted on the sleeve 14 and has an annular flange 20a serving as an abutment for the adjusting ring 21 which similarly to the adjusting ring 22 is independently rotatable. An end plate 23 carried by the spindle 7 has a recess 23a on the side towards the shaft 1, forming a shoulder against which the adjusting ring 22 bears. The end plate 23a is retained by an abutment constituted by an end plate 7a on the spindle 7.

The adjustment of the balancing weights 4 and 5 during the rotation of the grinding wheel 2 to reduce the out-of-balance of the grinding wheel to the maximum permissible value is effected as follows.

With the shaft 1 rotating, the rings 20, 21 and 22 are held by hand. Through the ring 15 the shaft rotates the sleeve 14 and sun pinion 13 which because the ring 20 is held stationary results in a planetary motion of the planet wheel 16 which through the stem 19 imparts a similar motion to the planets 17 and 18 so that the wheels 16, 17 and 18 make the same planetary motion in common. As the adjusting rings 21 and 22 are held stationary the wheels 17 and 18 through the sun pinions 12 and 11 set the sleeve 9 and spindle 7 in rotation. The sleeve 9 through the disc 10 carries with it the balancing weight 5 and the spindle 7 through the disc 6 and balancing weight 4. The two weights rotate in the same direction and at the same speed as the shaft 1. The out-of-balance under these conditions is measured by a measuring head 24 connected to an indicator 25 on which the value of the out-of-balance can be read.

With the ring 20 still held stationary, the adjusting rings 21 and 22 are rotated by hand until the indicator 25 shows an out-of-balance value of zero (or such value above zero as may be acceptable). The rotation of the rings 21 and 22 through the planet wheels 17 and 18, the sleeve 9 and spindle 7 effects a displacement of the balancing weights 4 and 5 relative to shaft 1 so that during the adjustment there is a relative movement between the rotating shaft and the balancing weights 4 and 5. If the adjusting rings 21 and 22 are rotated together in the same direction and at the same speed, the two balancing weights 4 and 5 will be moved in the same direction and through the same angle so that the angular position of the out-of-balance changes. By relative rotation of the rings 21 and 22 the position of the balancing weights relative to one another changes and thus the amount of out-of-balance.

In order to ensure self-centering of the adjusting rings 21 and 22 and in order to avoid any out-of-balance in the compensating device itself, the planet wheels 16 and 17 and 18 and the stem 19 are multiplied and symmetrically distributed. Suitably they are provided in triplicate.

The spring 8 serves to brake the balance weights against undesirable displacement when the device has been adjusted and the rings 20, 21 and 22 are left free. It acts by pressing the weight 4 against the inner end surface of the central bore 3 and shaft 1 and pressing the weight 5 against the ring 15. A slight clearance is left between the other end of each weight and the ring 15 and the inner end surface of the bore 3, suitably of 0.08 to 0.1 mm., this clearance being shown exaggerated in the drawing.

The invention is not limited to the embodiment illustrated and described above. Numerous changes can be made in detail without departing from the scope of the invention as defined by the claims.

I claim:

1. A device for compensating out-of-balance of a rotating mass having two balancing weights spaced from the axis of the rotating mass and serving to load it, which are adjustable in their angular position relative to the rotating mass both in common and individually, in which the balancing weights consist of respective bodies adjustable in a circular path in a central longitudinal bore in the shaft carrying the mass and in which the means for adjusting these balancing weights comprises three internally toothed rings mounted outside the shaft and rotatable coaxially in relation thereto, and at least one set of planet wheels rotatable on a common stem each of which meshes with a respective ring and one of three coaxial pinions, one of which pinions is coupled to the shaft and the other two of which are coupled each to one balancing weight, wherein the balancing weights consists of elongated bodies which are of annular sector form in cross section.

2. A device according to claim 1 in which each balancing weight has an inner circular extension the diameter of which corresponds to the distance of the balancing weights from the axis of the rotating mass.

3. A device according to claim 1 in which the balance weights are urged longitudinally away from one another by a compression spring or the like interposed between the two extensions.

4. A device according to claim 3 in which the pinion coupled to one of the balancing weights is secured to one end of a spindle the other end of which is fixed centrally in the circular extension of the balancing weight, while the pinion coupled to the other balancing weight is secured to one end of a sleeve surrounding the spindle and the other end of which is fixed in the circular extension of the other balancing weight.

5. A device according to claim 4 in which the outer end of the spindle is constructed as a retainer for an end plate which holds the adjusting means for the balancing weights in relation to the end of the shaft.

6. A device according to claim 5 in which the pinion coupled to the shaft is secured to the end of a sleeve projecting from the shaft, the other end of the sleeve being fixed centrally in a cover ring for the bore mounted on the end of a shaft.

7. A balance-compensating device for a rotary mass having an elongated central cylindrical bore, said device comprising two equal balancing weights located within said bore, said balancing weights being angularly adjustable and having aligned outwardly curved surfaces adapted to engage an inner surface of said bore and aligned inwardly curved surfaces, a disc firmly connected to an inwardly curved surface of one of said weights, another disc spaced from the first-mentioned disc and firmly connected to the inwardly curved surface of the other one of said weights, a sleeve having an end connected to one of said discs and extending coaxially thereto, a spindle fixed to the center of the other end of said discs and extending through the centers of said one disc and said sleeve, pinions carried by said sleeve and said spindle, a third pinion, means connecting said third pinion to the rotary mass, said three pinions having equal outer diameters, three rotary rings having inner teeth, and planet wheels engaging said inner teeth of the rings and said pinions.

References Cited

UNITED STATES PATENTS 2,164,900 7/1939 Campbell _____ 74—573
3,241,395 3/1966 Voller et al. _____ 74—573

FRED C. MATTERN, JR., *Primary Examiner.*

W. S. RATLIFF, *Assistant Examiner.*